United States Patent [19]

Kloppe et al.

[11] Patent Number: 4,474,405
[45] Date of Patent: Oct. 2, 1984

[54] TILT-SLIDING ROOF FOR MOTOR VEHICLES

[75] Inventors: Herbert Kloppe, Pulheim; Hans Vogt, Overath, both of Fed. Rep. of Germany

[73] Assignee: Ford Motor Company, Dearborn, Mich.

[21] Appl. No.: 453,265

[22] Filed: Dec. 27, 1982

[30] Foreign Application Priority Data

Jan. 28, 1982 [DE] Fed. Rep. of Germany ....... 3202646

[51] Int. Cl.³ .............................. B60J 7/04; B60J 7/14
[52] U.S. Cl. .................................... 296/220; 296/216; 296/219
[58] Field of Search ............... 296/217, 219, 220, 221, 296/223

[56] References Cited

U.S. PATENT DOCUMENTS

| 2,115,432 | 4/1938 | Simon | 296/219 |
| 2,861,836 | 11/1958 | Goeggel | 296/219 |
| 3,658,378 | 4/1972 | Sutren | 296/219 |
| 3,720,440 | 3/1973 | Podolan | 296/220 |
| 4,157,845 | 6/1979 | Queveav | 296/220 |
| 4,390,203 | 6/1983 | Lutz, et al. | 296/223 |

FOREIGN PATENT DOCUMENTS 1946161  1/1978  Fed. Rep. of Germany .

Primary Examiner—Richard A. Bertsch
Attorney, Agent, or Firm—Daniel M. Stock; Clifford L. Sadler

[57] ABSTRACT

The invention relates to a sliding roof for a motor vehicle in which a plurality of louvre-like roof sections 1, 2a, 2b and 3 are provided for closing the roof opening. An actuating device is operative when first actuated to tilt the roof sections by raising their rear edges so as to provide a ventilation position. Upon further operation of the actuating device, the roof sections move backwards and stack in their tilted up position (FIGS. 1, 1a and 1b).

In an alternative embodiment, the front roof section is hinged and remains in position to act as a draft reflector while the remaining roof sections slide and stack at the rear of the roof opening. (FIG. 1c)

13 Claims, 17 Drawing Figures

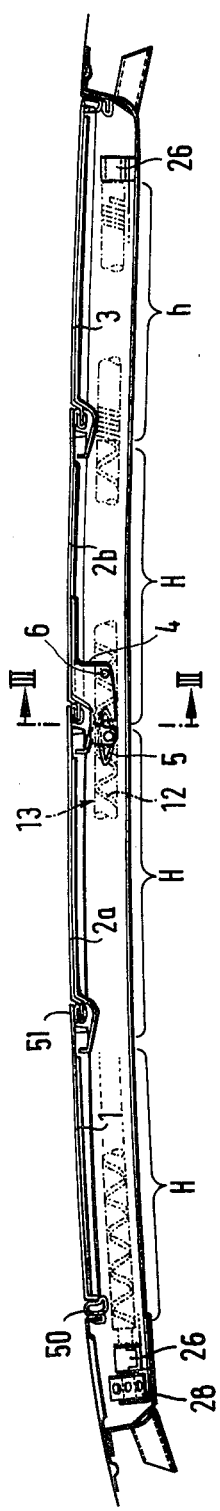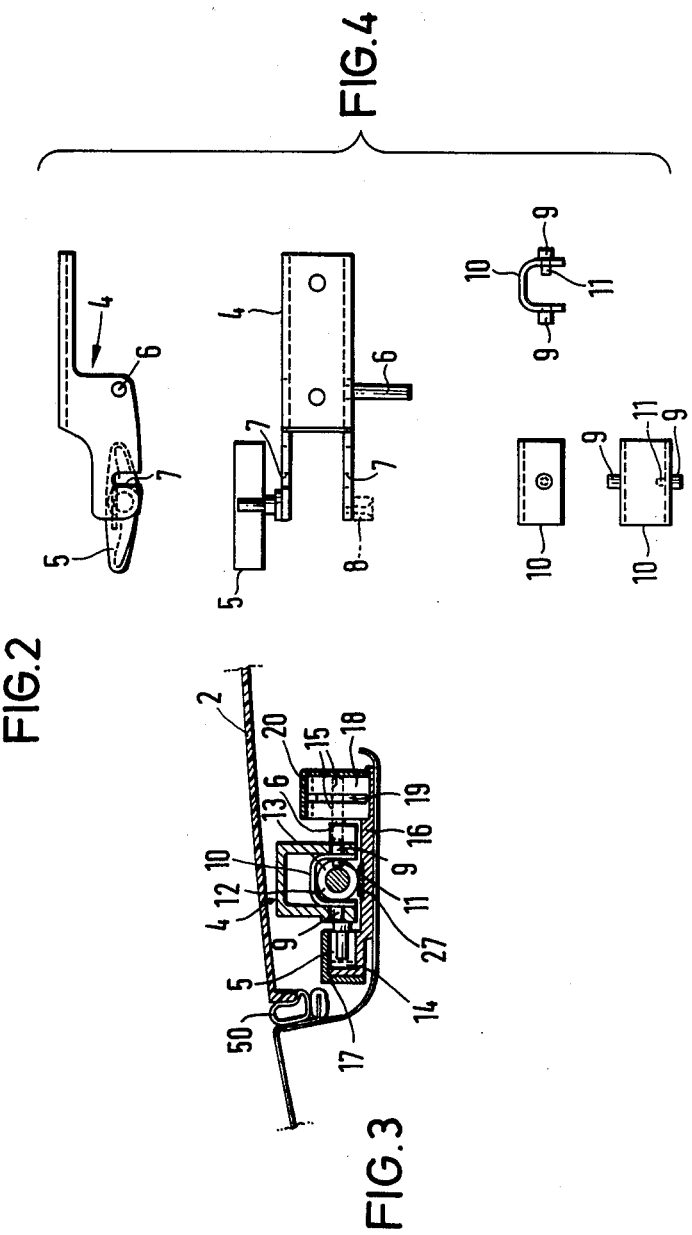

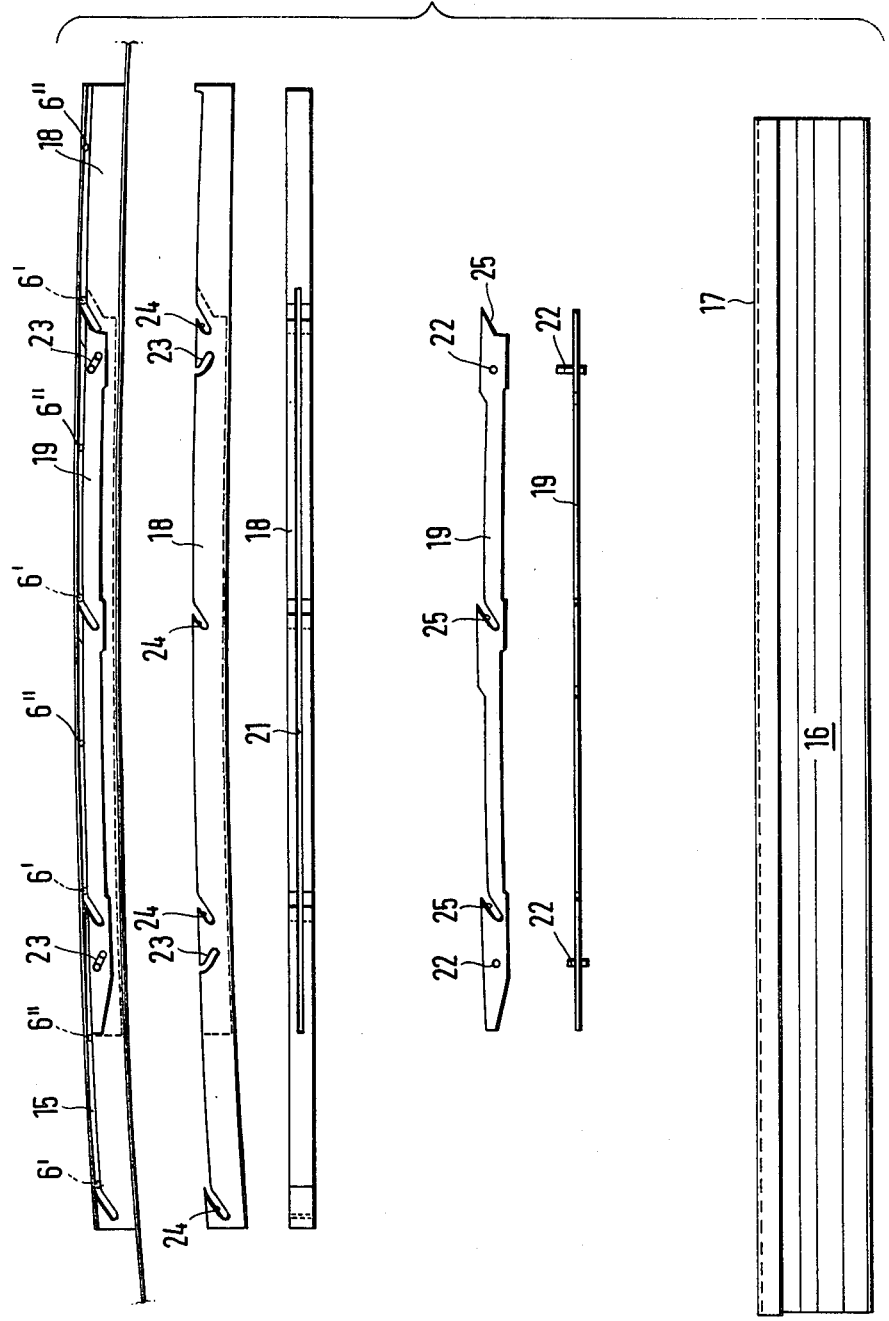

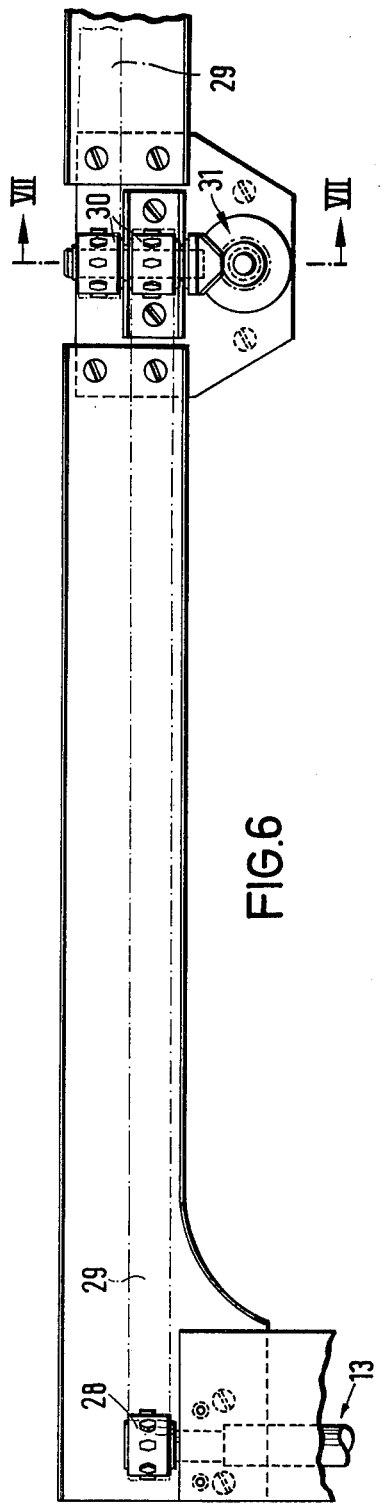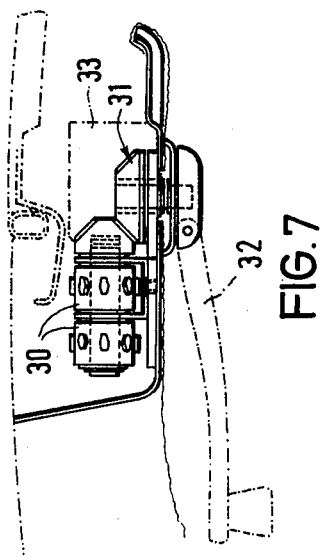

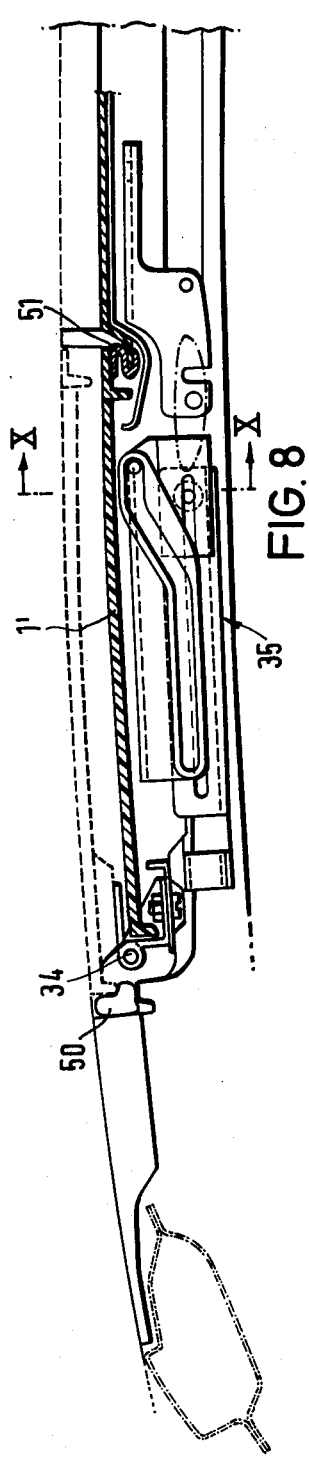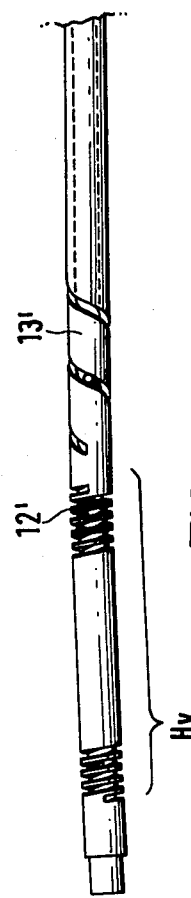

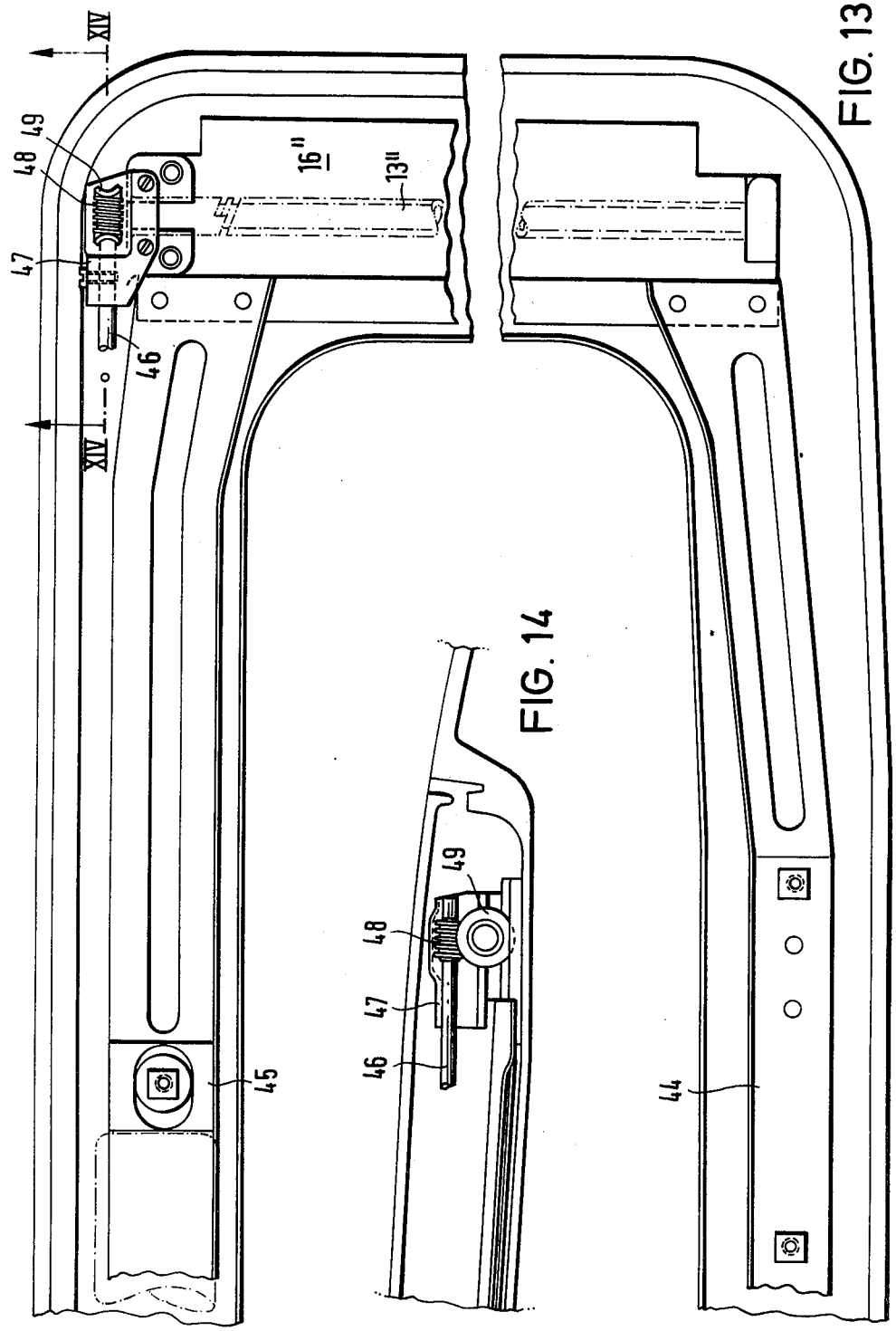

TILT-SLIDING ROOF FOR MOTOR VEHICLES

BACKGROUND OF THE INVENTION

The invention relates to a sliding roof for a motor vehicle.

A tiltable sliding roof for motor cars is known from German Auslegeschrift No. 19 46 161, in which a roof opening may be closed by two solid roof sections of approximately equal size which are separate and which, when the roof opening is closed, adjoin on another and form a joint extending transversely across the vehicle, and in which the roof opening is surrounded by a frame along which the two roof sections may be moved relative to one another in the longitudinal direction of the vehicle, the front cover part being tiltable by raising its rear edge.

This known roof has the disadvantage that while the front roof section can be tilted or slid, the rear roof section can only be slid. Consequently, only limited ventilation and only a limited opening of the roof are possible.

A sliding roof for motor cars is also known from German Auslegeschrift No. 20 32 144, in which a roof member consisting of a piece of flexible material is folded by way of alternately guided and non-guided supports, the folds forming a type of stack when the roof opening has been opened to the maximum extent.

This known sliding roof has the disadvantage that the roof member must consist of a flexible material which may easily be damaged and, in addition, a ventilating position is not possible.

A ventilating device, constructed in the manner of a louvered blind for vehicles is known from Gebrauchsmuster (Utility Model) No. 74 36 893, in which complete clearance of the opening closed by the sections or slats is not possible.

An automatic louvered blind for insertion in a roof is known from German Gebrauchsmuster No. 78 03 834, in which the clearance of the opening covered by the blind is likewise not completely achieved.

SUMMARY OF THE INVENTION

According to the present invention, there is provided a sliding roof for a motor vehicle comprising a plurality of louvre-like roof sections and an actuating device for opening the roof, wherein upon initial movement of the actuating device all the sections are raised at their edges substantially simultaneously to provide ventilation, and upon further movement of the actuating device all the sections or at least one group of sections slide together in their tilted state to form one or more stacks, in order to open the roof.

By virtue of the fact that a plurality of roof sections are arranged one behind the other and are laterally guided and controlled in such a way that at the beginning of movement of the actuating device, all the sections may be raised at their rear edges substantially simultaneously in the manner of louvered or Venetian blinds and in the further course of movement, all the sections or groups of sections may be slid together backwards to form one or more stacks in order to open the roof opening, an optimum ventilating position with the cover parts simultaneously tilted or a maximum clearance of the roof opening with the raised sections slid together to form a stack are both possible, according to requirements.

The roof sections may be appropriately guided and controlled in varying manner in accordance with the various requirements of different motor cars.

Thus, for example, in the case of a coupe motor car, the arrangement of only two sections may be preferred, whereas in the case of an estate car or station wagon a pluraity of sections may be arranged over the entire roof surface and may then be slid to form, for example, a central stack and an end stack of sections in order to avoid one excessively large stack.

It may likewise be advisable for the first roof section of a plurality of successive sections to remain in its position after being tilted in order to fulfill the function of a draft deflector.

BRIEF DESCRIPTION OF THE DRAWINGS

The invention will be described further, by way of example, with reference to the accompanying drawings, in which:

FIG. 2 is a vertical longitudinal section through a first embodiment of a sliding roof according to the invention;

FIG. 3 is a vertical cross-section along the line III—III in FIG. 2;

FIG. 4 is a spread-out view of the individual parts of a slide member;

FIG. 5 is a spread-out view of the individual parts which form the slide grooves and guide slots cooperating with the slide member;

FIG. 6 is a top view of the driving device of the sliding roof according to FIG. 2;

FIG. 7 is a vertical section along the line VII—VII in FIG. 6;

FIG. 8 shows a vertical partial longitudinal section through a second embodiment of a sliding roof according to the invention;

FIG. 9 is a partial view of the threaded spindle required for the embodiment of FIG. 8;

FIG. 13 is a top view of the components disposed in the front and rear areas of the sliding-roof frame; and FIG. 14 is a vertical section along the line XIV—XIV in FIG. 13.

DESCRIPTION OF A PREFERRED EMBODIMENT

Figure 1:
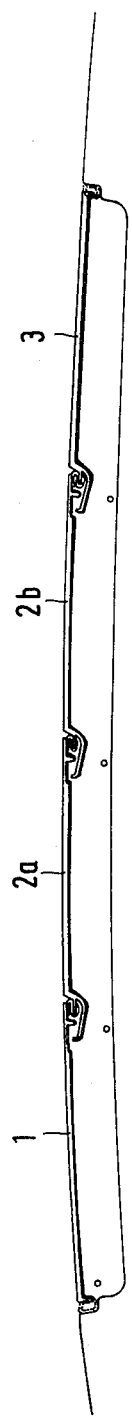
FIG. 1 is a diagrammatic, vertical longitudinal section through a sliding roof according to the invention shown in the closed position.

The Figures show a sliding roof for motor cars which comprises a front roof section 1, two similar intermediate sections 2a and 2b and a rear section 3, which are arranged inside a roof opening provided in a motor car roof.

The roof sections 1, 2a, 2b and 3 are attached to support brackets 4 (FIGS. 3 and 4) arranged at the sides of the roof opening and which have an essentially U-shaped cross-section and are provided with a sliding foot 5 of resilient material on one side and a guide pin 6 on the other side. Slots 7 are provided in the side walls of the support brackets 4. The brackets 4 are essentially the same for all roof sections, but those for the rear roof section 3 have an additional engaging member 8 shown in broken lines.

The support brackets 4 engage by way of their slots 7 the outer pins 9 of an essentially U-shaped nut 10 which engages by way of an internal pin 11 the screw thread 12 of a threaded drive spindle 13.

The sliding feet 5 or runners disposed on one side of the support brackets 4 are held in a lateral track 14, while the guide pins 6 projecting on the other side engage in lateral guide slots 15.

The tracks 14 are each formed between a rail 16 laterally disposed on the roof frame and a cover 17, while the guide slots 15 are defined in each case between a guide rail 18 acting in conjunction with a slide-block rail 19, and a cover 20.

As may best be seen in FIG. 5, the guide rail 18 is stationary and receives the movable slide-block rail 19 in a slot 21. The slide-block rail 19 is provided with pins 22 received in slots 23 in the guide rails. In addition, the guide rail 18 provided with inclined branch slots 24 corresponding to the number of roof sections.

The slide-block rail 19 is provided with inclines 25, the number of which is one less than the number of roof sections and the inclination of which corresponds to the slots 24.

The threaded spindle 13 is rotatably mounted at its front and rear ends on bearings 26 secured to the slide rail 16 and is supported along its length by a bearing strip 27 on the slide rail 16. The front end of the threaded spindle 13 is provided with pinion 28 by means of which it may be driven—via toothed belts or drive belts 29—by pinions 30 which may be actuated by a driving device disposed centrally either in the form of a hand crank 32 acting upon the pinion 30 by way of a bevel gear 31, or in the form of an electric motor 33 acting upon the pinion 30 directly and indicated by dash-dot (FIGS. 6 and 7).

As is clear from FIG. 2, the threaded spindle 13 has portions of equal coarse pitch H, the number of which is one less than the number of roof sections and to which is added a portion of substantially finer pitch h. In this case, the transition from the last coarse-pitch portion to the portion with finer pitch may be sudden or gradual.

The operation of this embodiment of a sliding roof will now be explained by reference primarily to FIGS. 2 and 3 but also to FIGS. 4 and 5.

Figure 1A:
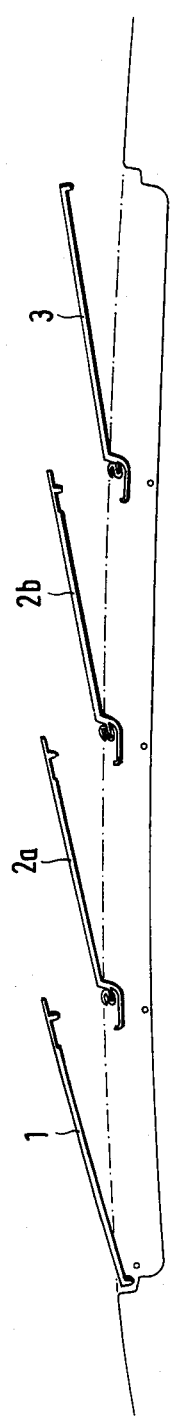
FIG. 1a is a similar section to FIG. 1, but in the raised ventilating position.
Figure 1B:
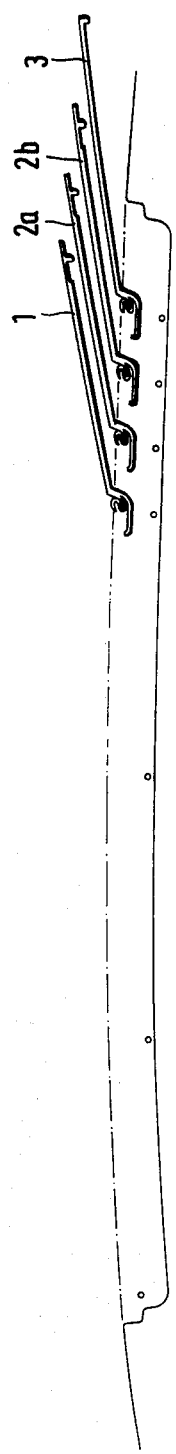
FIG. 1b is a similar section to FIG. 1, but in the fully opened position.
Figure 1C:
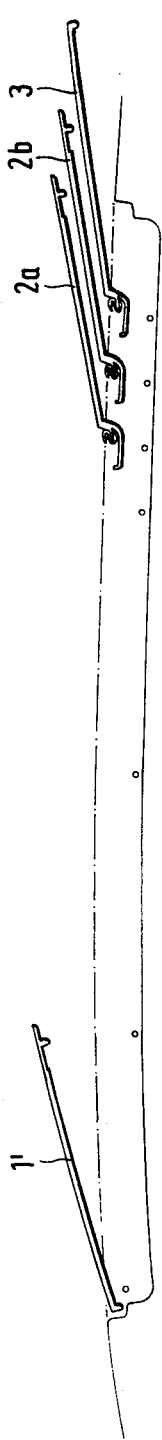
FIG. 1c is a similar section to FIG. 1, but in an alternative opened position with a first cover part remaining in its tilted position.

For this purpose, appropriate longitudinal sections through the sliding roof are shown in FIGS. 1, 1a, 1b and 1c in different operating positions, a closed position, a ventilating position and a stacked position of the roof sections 1, 2a, 2b and 3.

If the actuating device (hand crank 32 or electric motor 33) is operated when the sliding roof is closed, the threaded spindles 13 disposed on each side of the sliding roof are rotated by way of the pinions 30, the drive belts 29 and the pinions 28. The screwthread 12 of the threaded spindle 13 is in driving connection with the support brackets 4 by way of the inner pins 11 of the nuts 10, the outer pins 9 of which engage in the slots 7 of the said support brackets 4.

The guide pins 6 of the brackets 4 are at the lower end of the inclined slots 24 of the guide rails 18 in each case.

The rotational movement of the screwthread 12 results in a longitudinal movement of the brackets 4, whereby the latter are raised at their rear ends by way of the guide pins 6 and the inclined slots 24 and so the roof sections 1, 2 and 3 are simultaneously raised at their rear edges.

The upper part of FIG. 5 should not be turned to, in which the described position of the guide pins 6 is indicated in broken lines. If the threaded spindle 13 is rotated further, the guide pins 6 move from the position 6' indicated by broken lines into the position 6" indicated by dash-dot lines and in which the guide pins 6 of the front roof section 1 come to rest against the front edge of the slide-block rail 19 and push the latter to the rear as they move further, as a result of which it is simultaneously lowered on account of the pins 22 and the slots 23.

The position of the rear edges of the inclines 25 close the open slots 24 of the three rear roof sections, so that as the guide pins 6 continue to move along the guide slot 15 they are securely guided along one path.

During uniform rotation of the threaded spindle 13, the roof sections 1 and 2, which are raised at their rear end and which are in the portion of coarse pitch H of the threaded spindle, are moved backwards uniformly, while the roof section 3, which is already in the portion with the finer pitch h, is moved considerably more slowly. As soon as the successive sections reach the area of fine pitch h, their movement, too, is retarded so that at the end of movement all four sections have been pushed together to form a narrow stack.

If the threaded spindle 13 is moved in the opposite direction in order to close the sliding roof again, movement is effected substantially in the reverse direction, until the pins 6 in the slot 15 arrive back at the position 6" indicated by dash-dot lines. At this point, the engaging members 8 provided on the support brackets 4 for the rear roof section 3 come into contact with the rear extended pin 22 of the slide-block rail 19 and lift the latter again, and as the threaded spindle 13 is moved further, the pins 6 are drawn into the inclined slots 24 in the guide rail 18 and thus the roof sections are tilted back into their position.

Figure 10:
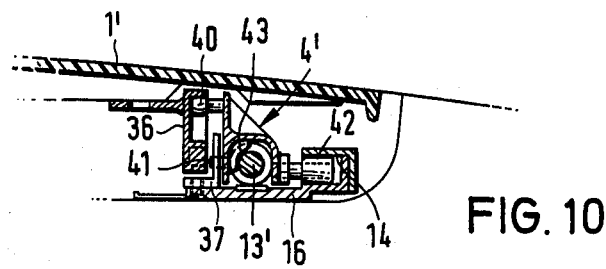
FIG. 10 is a vertical cross-section along the line X—X in FIG. 8.
Figure 11:
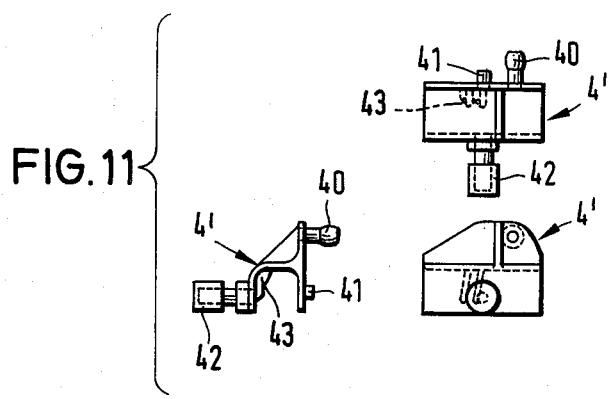
FIG. 11 is a spread-out view of a special guide member.
Figure 12:
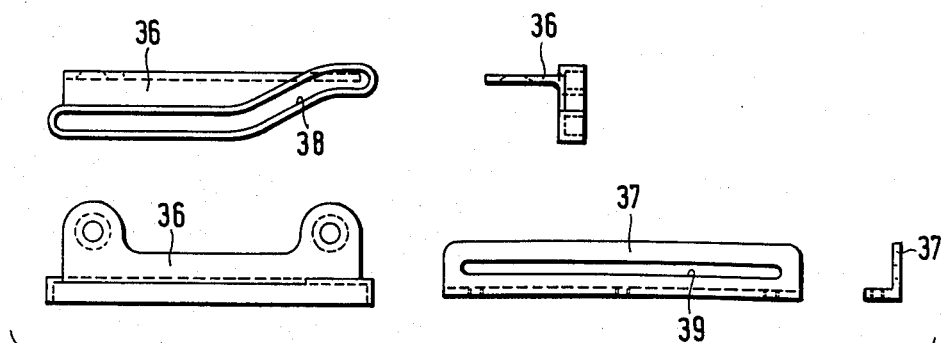
FIG. 12 is an illustration—spread out in various views—of the guiding slide block cooperating therewith.

A second embodiment of a sliding roof according to the invention, which corresponds to the embodiment already described except for the arrangement and control of the first roof section 1', is explained in FIGS. 8 to 12.

Since, in the case of this embodiment, the first roof section 1' must remain in its position after being raised while the other sections are slid together to form a stack (see FIG. 1c), this roof section 1' must be provided with a different control, which is described below.

As shown in FIG. 8, the front roof section 1' is mounted on the front sliding roof frame so as to be pivotable by means of a hinge member 34 and is supported laterally by a slide-block guide arrangement 35.

The slide-block guide arrangement 35 comprises a slide block 36 secured to the front roof section and a guide 37, having a groove 38 and a slot 39, respectively, which cooperate with a guide pin 40 and a guide lug 41 of a special support bracket 4'. The special support bracket 4' comprises a runner 42, which projects into the track 14, and it is provided with an inner projection 43 by which it engages in the screwthread of a threaded spindle 13' which has a threaded portion Hv with the thread running in the opposite direction.

At the beginning of movement of the actuating device 13', the runner 42 of the support bracket 4' is in the upper area of the groove 38 and is moved forward by the bracket 4' which engages by way of the inner projection 43 with the portion Hv of the threaded spindle 13' with the thread running in the opposite direction, as a result of which the roof section 1' is tilted up. In this connection, it should be noted that the bracket 4' is guided on the one hand in the slot 39 by the lug 41 and on the other hand in the track 14 by the runner 42. The pitch of the threaded portion Hv in the opposite direction is designed to be such that during the beginning of movement of the actuating device 13', the pin 40 of the special bracket 4' only moves along the curved part of the groove 38, while in the course of the further movement, during which the remaining roof sections are slid together backward to form a stack, it only moves in the straight part of the groove 38 and so the raised position of the first roof section 1' remains unchanged.

In FIGS. 13 and 14, a further embodiment of a sliding roof according to the invention is shown in which a different drive arrangement is provided for the lateral threaded spindles 13''. In this case, lateral slide rails 16'' are connected to a front crossbar 44 and a rear crossbar 45 to form a pre-assembled unit. It is possible for the hinge member 34 for the front cover part 1' to be disposed on the front crossbar 44 and for a drive unit to be disposed on the rear crossbar 45, and the said drive unit may consist of a hand crank or an electric motor (not shown), the movement of which is transmitted to the threaded spindles 13'' by way of rotating shafts 46, a worm 48 mounted in a guide housing 47 and corresponding worm wheels 49 on the said threaded spindles 13''. Alternatively, the threaded spindles may be rotated by two synchronously controlled electric motors.

The individual roof sections 1, 2a, 2b and 3 are, of course, sealed with respect to the roof opening and with respect to one another by way of corresponding sealing profiles 50 and 51, respectively, which are illustrated in the drawings but are not described in detail.

The sections may be formed either as pressed sheet-metal parts or, preferably, as plastics or glass parts. When made from plastics material, the roof sections may be formed integrally with the support brackets, where appropriate.

We claim:

1. A sliding roof for a motor vehicle comprising a plurality of louvre-like roof sections and an actuating device for opening the roof, wherein the sections are connected to laterally disposed brackets which are provided with sliding feet and with guide pins, the sliding feet being arranged to slide in tracks and the guide pins being arranged to slide in lateral guide slots extending in the longitudinal direction of the vehicle and shaped in such a manner that at the beginning of an opening operation of the actuating device, all the brackets move backwards as a result of which the guide pins cooperate with the lateral guide slots to tilt the roof section to provide ventilation, and in the course of further movement of the actuating device at least one group of the roof sections are moved backwards in their tilted position to form a stack effecting opening of the roof.

2. A sliding roof as defined in claim 1, in which the actuating device comprises a threaded spindle which cooperates with nuts in driving engagement with the support brackets.

3. A sliding roof as defined in claim 2, in which the threaded spindle has consecutive portions of equal coarse pitch, the number of which is one less than the number of slidable roof sections in a group followed by a portion of finer pitch for causing the sections in the group to stack.

4. A sliding roof as defined in claim 3, in which the transition on the threaded spindle from coarse to finer pitch is gradual.

5. A sliding roof as defined in claim 2, in which the threaded spindle is journaled in bearings and rests upon a bearing strip.

6. A sliding roof as defined in claim 2, in which two lateral threaded spindles are provided driven by pinions of a centrally disposed actuating device by way of pinions and toothed belts or drive belts, the pinions being actuated either by a hand crank by way of a bevel gear or directly by an electric motor constituting the actuating device.

7. A sliding roof as defined in claim 2, in which two lateral threaded spindles are provided driven by two separate synchronously controlled electric motors.

8. A sliding roof as defined in claim 2, wherein the drive mechanism for the roof sections is mounted on two rails which are interconnected by means of a crossbar to form a pre-assembled unit.

9. A sliding roof as defined in claim 1, in which the lateral guide slots are defined by a guide rail having a longitudinal slot and inclined branch slots for tilting the roof section during initial opening and a slide block rail retractable into the guide rail following initial longitudinal movement of the roof sections in order to close the inclined slots and present a smooth guide slot for guiding the roof sections.

10. A sliding roof as defined in claim 9, in which the slide block rail is retracted into the guide rail by engagement of the slide rail with the front sliding roof section and is made to project from the guide rail to open the branch slot by engagement with the rear sliding roof section.

11. A sliding roof as defined in claim 1, wherein the front roof section is arranged to remain in its position after being tilted upwards so as to act as a draft deflector.

12. A sliding roof as defined in claim 11, in which the front roof section is connected to a slide block having a groove into which engages a guide pin formed on a bracket connected to be moved towards the front of the vehicle upon operation of the actuating device to open the roof.

13. A sliding roof as defined in claim 11, wherein the slide rails are connected by front end rear crossbars to form a pre-assembled unit, the front crossbar carrying a hinge for the front cover section and the rear crossbar supporting a drive unit.

* * * * *